Feb. 11, 1969 C. A. OPPEDAHL 3,427,520

DC SERVO AMPLIFIER FOR ARMATURE DRIVE MOTOR

Filed Dec. 27, 1965 Sheet 1 of 2

FIG I

INVENTOR.
CHARLES A. OPPEDAHL

BY Moody & Anderson

AGENTS

DC SERVO AMPLIFIER FOR ARMATURE DRIVE MOTOR

Filed Dec. 27, 1965

INVENTOR.
CHARLES A. OPPEDAHL
BY Moody & Anderson
AGENTS

United States Patent Office 3,427,520
Patented Feb. 11, 1969

3,427,520
DC SERVO AMPLIFIER FOR ARMATURE DRIVE MOTOR

Charles A. Oppedahl, Cedar Rapids, Iowa, assignor to Collins Radio Company, Cedar Rapids, Iowa, a corporation of Iowa Filed Dec. 27, 1965, Ser. No. 516,567
U.S. Cl. 318—18 5 Claims
Int. Cl. H02p 5/50, 7/68

ABSTRACT OF THE DISCLOSURE

A bridge drive arrangement for a direct current motor is responsive to a pair of differential pulse width control signals of a predetermined repetition rate to drive the motor in response to the magnitude and polarity of a differential direct current input signal. Current from a direct current power source is switched through the motor in one direction or the other to define rotation direction and the pulsetrain duty cycle defines speed of rotation. In response to zero input signal, the system disconnects the direct current power source from the motor.

This invention relates generally to motor control and more particularly to a servo amplifier control means for an armature drive motor such as a permanent magnetic motor.

The object of the present invention is the provision of a lightweight transistorized DC servo system employing transistors operating in the switching mode to minimize power requirements and wherein the power for the motor drive is a DC source.

Numerous AC servo systems exist wherein magnetic servo amplifiers are employed which inherently place high power requirements on the AC power supply. This situation ofttimes becomes critical—for example, in autopilot installations wherein high power requirements may be placed on the aircraft 400 c.p.s. alternator by other equipments. The present invention therefore features a DC servo amplifier which employs DC amplifiers and which may operate from the aircraft 28-volt DC main.

The present invention is further featured in the provision of a servo amplifier employing transistor switching techniques wherein the motor is controlled as a function control of switching times such that power requirements are reduced and an inherent reduction in the thermal problems associated with highly dissipative arrangements is realized.

The present invention is accordingly featured in the development of differential pulse width control pulses of predetermined repetition rate from a differential DC input signal. Directional current flow through a permanent magnet motor is effected as a function of the differential pulse width control pulses.

The control circuitry further features a bridge drive arrangement for a permanent magnet motor to which differential pulse width control pulses are applied to effect bidirectional motor control. The motor is driven for a predetermined period of time during each repetitive control cycle. The drive time is a function of an input error signal which in turn is converted to differential pulse width control pulses. During the remaining portion of each repetitive control cycle the motor acts as a generator with low impedance load and dynamic braking is instituted. This latter expedient serves to eliminate the need for a rate generator which might conventionally be used in a closed loop servo system, since dynamic braking, in being a means to slow down a motor armature as a function of armature speed, is analogous to a rate generator feedback function.

These and other features and objects of the invention will become apparent upon reading the following description in conjunction with the accompanying drawings in which.

The control aspect of the present invention is based on the development of differential control pulses from a differential DC input signal. The motor to be controlled is connected across a first diagonal of an output bridge the arms of which comprise transistor members. The transistor members are operated in a switching mode in response to the application of the differential control pulses to connect a DC power source in one polarity or the other across the motor terminals and to disconnect the DC power source when the input signal is zero. The differential pulse width control pulses are developed in a differential amplifier comprising identical channels each connected to one terminal of the differential DC input signal. Each amplifier, under the control of a periodic timing waveform, develops an output control pulse the duty cycle of which is a function of the magnitude and polarity of the differential input signal. In essence then, the duty cycles of the differential pulse width output pulses from the amplifier sections are differentially varied as the magnitude and polarity of the differential input signal varies. Power is switched to the motor with polarity dependent upon which of the bridge control pulses appears first in time within each control cycle. Dynamic braking of the motor is effected during the initial and terminal portions of each control cycle during which the output amplifier stages exhibit a like conductivity state.

Figure 1:
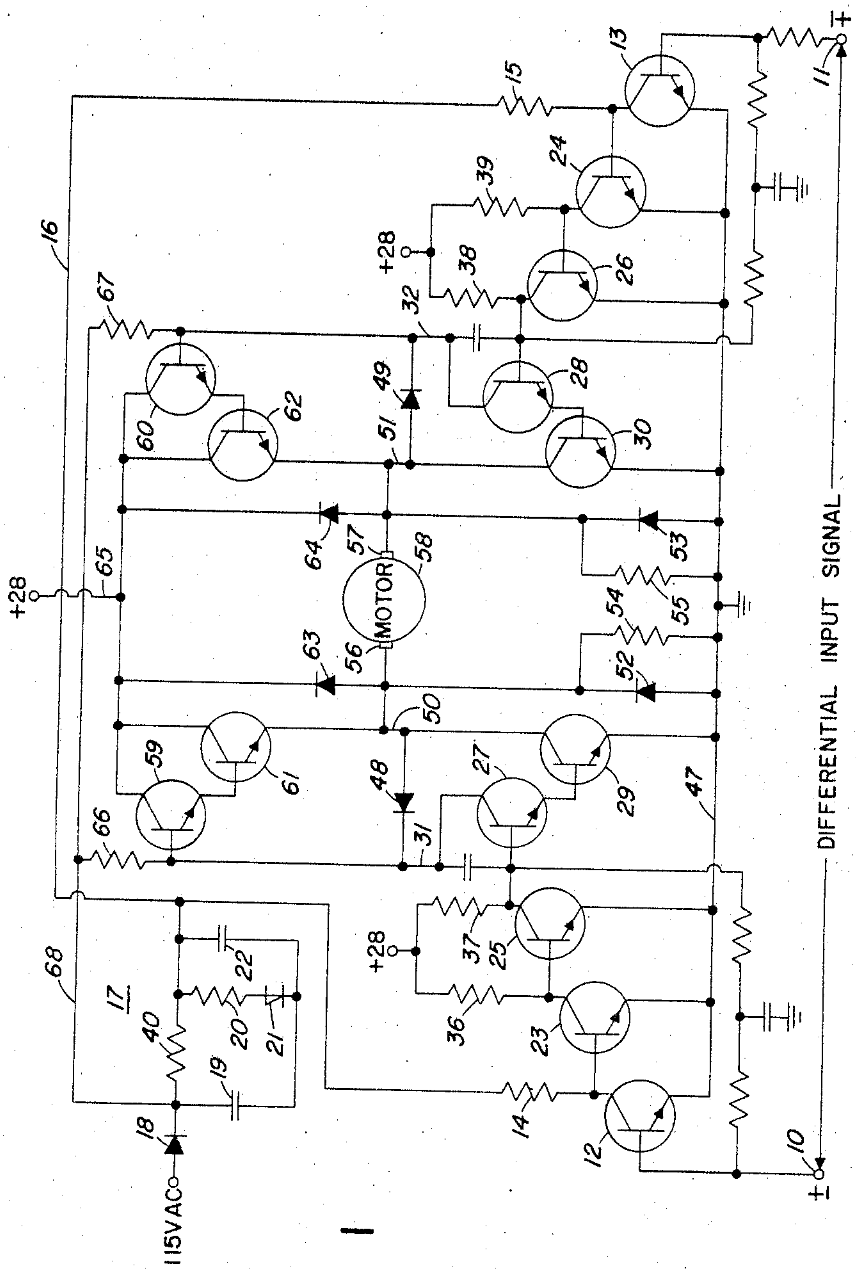
FIGURE 1 is a schematic diagram of an embodiment of the present invention including the motor bridge drive arrangement operating under differential pulse width control signals in accordance with the invention, along with a type of differential pulse width amplifier which might be used to develop differential pulse width control pulses from a differential DC input signal.

With reference to the schematic configuration of FIGURE 1, a differential input signal is applied to input terminals 10 and 11. The input signal 10–11 might be a conventional DC signal floating with respect to a reference which in the embodiment to be described, is the junction voltage of amplifier input transistors. For zero input, the potential difference between the terminals 10 and 11 is zero. Each of the input terminals 10 and 11 is connected to the input of a cascaded chain of transistors. Input terminal 10 is connected to the base of a first transistor 12, the collector of which is connected to the base of a succeeding transistor 23, the collector of transistor 23 is connected to the base of a further transistor 25, and finally, the collector of transistor 25 is connected to the base of an output transistor pair comprised of transistors 27 and 29, connected to a "super alpha" configuration with the collectors connected in common and the emitter of the transistor 27 connected to the base of transistor 29. This expedient is utilized to obtain a current gain which is approximately a product of the current gain characteristics of the two transistors. In the instant application, the output transistor of the amplifier section comprises the two transistors so connected to provide sufficient gain to ensure saturation of the output transistor. The collector elements of transistors 23 and 25 are returned through load resistors 36 and 37 to a positive DC source 28 while collector of the output transistor 29 is connected in a motor control bridge circuit. The collector of input transistor 12 is returned through a load resistor 14 to a DC ramp signal 16 produced by a periodic ramp generator 17. The ramp voltage 16 might vary from zero to a predetermined positive voltage in a linear manner and repeat at some predetermined repetition rate. Thus the input 10 is applied to the base of transistor 12 while its collector has applied thereto a DC voltage repetitively increasing between zero and some finite positive value. The current in the load resistor 14 is thus compared with the maximum allowable collector current where the maximum collector current is equal to the base current multiplied by the transistor current gain. When the current in the collector load resistor equals the allowable maximum collector of the transistor 12, the collector potential of transistor 12 rises to effect a chain reaction by turning on the succeeding transistor 23 which in turn turns off the following transistor 25. When transistor 25 is turned off, transistors 27 and 29 are turned on. The gain in the chain of transistors is sufficient to drive the output transistor pair 27–29 into saturation.

In a similar manner, the input terminal 11 is connected to an identical amplifier chain comprised of an input transistor 13 followed by transistors 24 and 26 and an output transistor pair 28–30. Under a condition of an input error signal, input terminal 11 is at an opposite potential and equal magnitude as concerns terminal 10 and thus the "comparison" performed by the input transistor 13 is made on the basis of the identical ramp voltage 16 being applied to the collector element, but a potential of opposite polarity and equal magnitude being applied to the base as compared with input transistor 12. If terminal 11 is positive and terminal 10 negative, input transistor 13 would be turned on at some finite time later than that of input transistor 12, and thus the output transistor pair 28–30 would go into saturation at some finite later time. A variation in magnitude of the differential DC input signal advances the firing point of one transistor pair while it retards the firing point of the other by the same degree such that a differential pulse width control is effected.

A feedback network is associated with each of the amplifier channels. The collector of the transistor 25 is connected through an R.C. filter network to the terminal 10 while the collector of the transistor 26 in the other channel is returned through the R.C. filter network to the input terminal 11. The feedback networks apply as feedback a DC signal which is a measure of the time that the channel output transistor is being driven on so as to stabilize the gain of the amplifier channel over the dynamic range of the differential input signal being applied.

The amplifier output transistor pairs 27–29 and 29–30 form two arms of a bridge circuit the other arms of which are comprised of further transistor pairs 59–61 and 60–62. The positive terminal of a DC voltage source 28 is connected across a first diagonal of the bridge arrangement by being connected to the collectors of transistor pairs 59–61 and 60–62, while the ground return 47 of the DC voltage source 28 is connected to the emitter elements of the amplifier output transistors. A permanent magnet DC motor 58 is connected across the other diagonal of the bridge with a first terminal 56 being connected to the interconnection 50 between the emitter of transistor 61 and collector of transistor 29 and the second terminal 57 connected to the interconnection between the emitter of transistor 62 and the collector of transistor 30.

Each of the transistor pairs forming the bridge arms is shunted by a diode member with polarization opposite that of the associated emitter-collector connection. Thus, the diode 63 is connected across the emitter-collector junction of transistor 61 with the anode connected to the emitter of the transistor. A diode member 64 is similarly connected across the emitter-collector junction of the transistor 62 with its anode connected to the emitter of the transistor 62. Diode members 52 and 53 are likewise connected across the emitter-collector junctions of the amplifier output transistors 29 and 30, respectively.

To complete the bridge arrangement, the base element of transistors 59–60 are returned through load resistors 66 and 67 respectively to a positive DC bias source through line 68 such that transistor pairs 27–29 and 59–61 are differentially interconnected as well as transistor pairs 28–30 and 60–62.

The aforementioned ramp voltage applied to the input transistor of the two amplifier chains is illustrated as the output 16 of a ramp generator 17. Ramp generator 17 operates from a 115 volt AC line. The AC signal is rectified and filtered through the action of diode 18 and capacitor 19 to provide approximately 100 volts DC at the junction of the diode 18 and capacitor 19. This potential is taken through line 68 as the DC bias signal for the transistor bridge. The voltage across capacitor 19 is applied across the series combination of resistors 40 and 20 and a Shockley diode 21. When the voltage across capacitor 19 reaches a predetermined level, the Shockley diode 21 fires and discharges through the resistor 20. When discharge is completed, the Shockley diode 21 recovers to complete a cycle. The output 16 from the ramp generator 17 is thus a repetitive ramp voltage varying from zero to a predetermined voltage level at which the Shockley diode fires. The frequency of the ramp signal is not critical in its effect on the differential amplifier operation of the invention.

The ramp frequency would not be chosen to be very high because too great a portion of time of the switching action would be spent in the high dissipation region between "on" and "off." On the other hand, at very low ramp frequencies, the motor torque would occur in distinguishable pulses. Further, the ramp frequencies would preferably not be harmonically related to 400 c.p.s., since motor torque might occur in low frequency pulses because of interaction of 400 c.p.s. ramp signal with 400 c.p.s. noise which might be present in the amplifier input signal. Thus, for a particular application, a ramp frequency of 600 c.p.s. might be chosen to avoid these undesirable possibilities. Experimentation has shown that the ramp frequency in a particular embodiment could vary between 400 and 800 c.p.s. without noticeable effect on amplifier performance.

Figure 2:
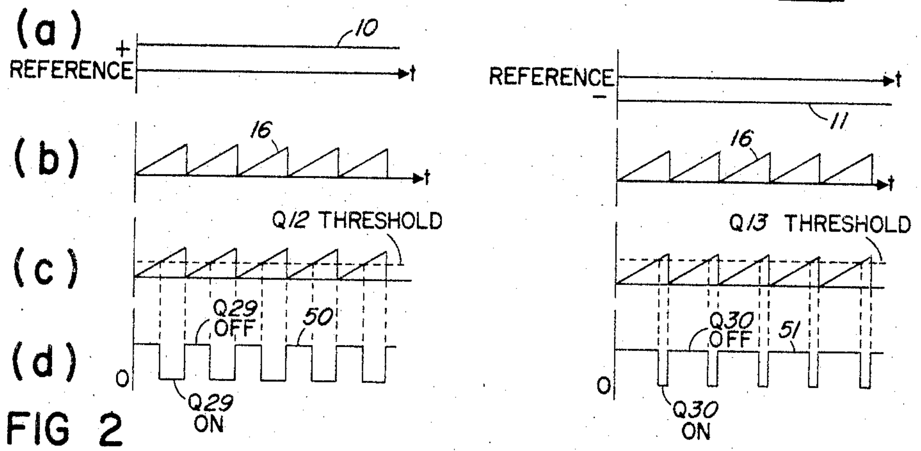
FIGURE 2 is a dynamic representation of the formulation of differential pulse width control signals from a differential DC source.
Figure 3:
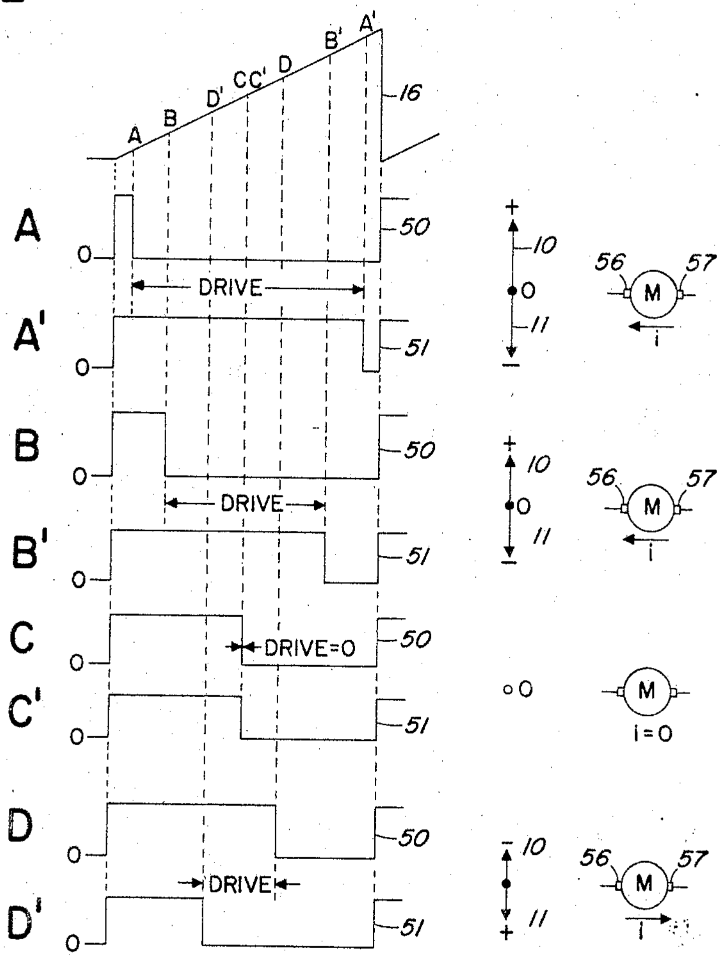
FIGURE 3 is a further diagrammatic representation of the motor drive and braking control aspects during one control cycle.

The operation of the output bridge arrangement and the manner in which it responds to differential pulse width input signals to effect bidirectional motor control with the novel inclusion of motor dynamic braking may best be comprehended from a consideration of operation waveforms depicted in FIGURES 2 and 3.

FIGURE 2*a* illustrates a typical differential DC input 10–11 represented by voltages respectively positive and negative with respect to zero reference by some equal magnitude. FIGURE 2*b* represents the ramp waveform 16 from ramp generator 17 to which the collector load resistors 14 and 15 of amplifier input transistors 12 and 13 are returned. As previously described, the input stages of the amplifier compare the DC input signal on the transistor bases to the ramp signal. When the ramp current in the collector load resistors 14 and 15 equals the turn on current of the associated input transistor as defined by its base potential, the collector voltage of the transistor raises and initiates a chain reaction to drive into saturation the associated amplifier output transistor pairs 27–29 and 28–30. Waveform 2(*c*) therefore indicates, in conjunction with the ramp voltage applied to the input transistor collector, a "threshold" level which would be established by the magnitude and polarity of the input signal. When the DC ramp voltage reaches the threshold level, the collector voltage of the input transistor falls to initiate the chain reaction which subsequently drives the associated output transistor pair into saturation as indicated by waveform 2(*d*). The input 10, being positive, establishes a threshold for transistor 12 which is lower than that established by input 11 for transistor 13 and output transistor pair 27–29 is driven into saturation at a time prior to the time that the ramp meets the threshold of input transistor 13 which has a negative input potential applied to its base. During any one cycle of the ramp signal, which hereafter will be referred to as a control cycle, the collector voltages of the amplifier output transistors 29 and 30 are seen to be waveforms whose pulse width or duty cycle is a function of the input signal magnitude and polarity.

The amplifier output transistors 29–30 are therefore driven into saturation during each control cycle at discretely different times for varying input signal magnitudes, the output transistor 29 being driven into saturation prior to output transistor 30 for input signals of the relative sense (polarity) depicted in FIGURE 2. For input signal of polarity opposite that depicted in FIGURE 2, the amplifier output transistor 30 will be driven into saturation prior to output transistor 29.

FIGURE 3 depicts various pairs of waveforms corresponding to the collector voltages of the output transistors of the amplifiers for various magnitudes and polarities of input signals. Waveforms A and A′ depict the collector voltages 50 and 51 of the output transistors 29 and 30 for a relatively large input signal with inputs 10 and 11 respectively positive and negative with respect to zero reference. At point A on the ramp 16, the output transistor 29 is driven into saturation due to the threshold being met in the associated input transistor 12 due to the positive base signal 10. The output 50 then falls to zero or ground potential for the remainder of the control cycle. Since the input 11 applied to input transistor 13 is negative the threshold of the input transistor 13 is met at a later time in the control cycle at point A′ on the ramp 16. As will be further described the output waveforms A and A′ drive the motor in a particular direction during that period of time when the outputs 50 and 51 are of opposite state. FIGURE 3 illustrates this time period as being a drive time effecting a first direction of motor rotation.

Waveforms B and B′ depict the output waveforms for a decreased input signal of the same sense. Since input 10 is less positive, the threshold as concerns input transistor 12 is met at a later point B on the ramp 16 such that output transistor 29 is driven into saturation at a later time in the control cycle. Waveform B′ depicts that the threshold of input transistor 13 is met proportionally sooner in the control cycle at point B′ on the ramp 16 such that the duty cycle of the output waveforms 50 and 51 varies differentially. The drive time is correspondingly reduced.

Waveform C and C′ indicate the condition of zero input. Output waveforms 50–51 are symmetrical during the control cycle and there is no time during which the waveforms are of opposite state and thus no motor drive time is effected.

Waveforms D and D′ indicate a reversal in the sensing of the input signals 10–11 wherein input signal 10 is negative with respect to zero reference while input signal 11 is positive. In response to this condition the threshold of the input transistor 13 is met sooner than that of input transistor 12 such that output transistor 29 is driven into saturation at a later time in the control cycle than is output transistor 30. The drive time is again defined as that period of the control cycle time during which the two output waveforms are in opposite state and motor rotation in this instance is effected in a reverse direction.

The amplifier sections are thus seen to develop output waveforms at a rate established by the ramp 16 whose duty cycles vary differentially in response to the variation of the differential input DC signal. A motor drive time has been defined as a period of time during each control cycle during which the output waveforms are in opposite states. As will be further described those portions in each control cycle depicted in FIG. 3 during which the output waveforms are of like state, that is simultaneously "on" or simultaneously "off," the motor is not driven but is shunted by a low resistance to effect dynamic braking.

The differential pulse width amplifier signals represent the collector voltages of the amplifier output transistors which comprise two arms of a motor drive bridge. The collector-emitter circuit of output transistor 29 forms a series connection between motor terminal 56 and ground while the collector-emitter circuit of the output transistor 30 forms a series connection between motor terminal 57 and ground. Likewise, the collector-emitter circuit of a further bridge transistor 61 forms a series connection between a positive DC voltage source 28 and motor terminal 56 while the emitter-collector circuit of a transistor 62 forms a series connection between the DC source and motor terminal 57. Due to the interconnection between amplifier output transistor pair 27–29 and bridge transistor pair 59–61, when output transistor 28 is driven to saturation, transistor pair 59–61 is cut off. Alternatively, when amplifier output transistor pair 27–29 is cut off, the bridge transistor pair 59–61 is driven into saturation. This action is effected by means of the common load resistor 66. Amplifier output transistor pair 28–30 and bridge transistor pair 60–62 are similarly interconnected with a common load resistor 67 so that one pair is cut off when the other is saturated and vice-versa. The operational significance of the waveforms of FIGURE 3 is thus to effect connection of the DC source 28 to one motor terminal while grounding the other motor terminal during drive times.

Considering the waveforms of FIGURE 3 in conjunction with the circuitry of FIGURE 1 let it be assumed that the input signals 10–11 are of a relative polarity and magnitude such that the amplifier output waveforms 50–51 are those depicted as waveforms A and A′. During the initial portion of the control cycle to point A where amplifier output transistor 29 is driven into saturation, neither of the amplifier output transistors 29 or 30 is conductive. Due to the differential action effected by the common load resistors 66 and 67, the associated bridge transistors 61 and 62 are driven to saturation during this period. Current does not flow through the motor 58 since there is no ground path from either motor terminal through the amplifier output transistors in the bridge. There is during this period, however, a current path for the BEMF voltage of motor 58 through either transistor 61 and diode 64 or transistor 62 and diode 63, depending upon the particular direction of rotation which would have been effected during a previous drive period. This action shunts the motor terminals with a very low resistance and introduces dynamic braking since the permanent magnet motor is coasting and acting as a generator with a low impedance load.

At point A on the ramp 16 of FIGURE 3, the left amplifier channel threshold is reached and output transistor 29 is driven into saturation. With output transistor 29 fully "on," the bridge transistor 61 is cut off. Terminal 57 of the motor is connected through the conductive transistor 62 to the DC source 28, while motor terminal 56 is grounded through conducting transistor 29.

As the ramp voltage 16 rises to the point A′ the amplifier output transistor 30 is driven into saturation such that both the amplifier output transistors are fully "on" and their corresponding bridge transistors are turned "off." Thus, during the remainder of the control cycle the DC source 28 is completely disconnected from the motor 58 while motor induction current finds a path through either transistor 29 and diode 53 or transistor 30 and diode 52, depending upon the polarity of the induction voltage. Dynamic braking is thus effected during the terminal portion of the cycle.

Motor 58 is then driven in pulsed fashion with the drive time being a function of the magnitude of the differential input signal and the pulsed drive periods are interspersed with periods during which dynamic braking is effected since the bridge network provides a low impedance path for motor induction current by means of appropriate transistor-diode combinations.

Under the conditions of zero input signal as depicted by waveform C and C′ of FIGURE 3, there is no time during the control cycle that the amplifier output transistors 29–30 are in opposite conductive states. The collector waveforms of the amplifier output transistors are identical since, in the absence of differential DC voltages on the bases of the input transistors, the threshold of both input transistors is purely a function of the ramp signal which is identically applied to each. Output transistors 29 and 30 therefore are driven into saturation simultaneously. During the first portion of the cycle when the output transistors are "off," the associated bridge transistors 61 and 62 are both "on" due to the differential interconnection but no power is applied to the motor. Motor BEMF currents then flow through the aforedescribed diode transistor series paths in the upper portion of the bridge. During the latter portion of the control cycle under the condition of zero input signal, the amplifier output transistors 28 and 30 are each saturated and their associated bridge transistors are in turn cut off. Again, no power is applied to the motor and motor BEMF currents may flow through the aforedescribed transistor-diode series paths in the lower portion of the bridge.

Since the motor is driven by pulses, collapsing fields in the armature windings generate inductive currents which are provided a path by diode pairs 64–52 and 63–53 depending on the direction of drive current through the motor at the end of a particular drive cycle. The diode pairs then allow continuous current flow in the armature winding.

Further analysis of the bridge control circuitry in conjunction with waveforms D and D′ of FIGURE 3 reveals that a reversed polarity of the input signal causes a reversal of the relative conductivity states of the amplifier output transistors during the drive time and current flow through the motor is reversed.

Although the embodiment of FIGURE 1 includes a particular differential amplifier arrangement for converting the conventional input DC signal to differential pulse width drive signal for the bridge, it is contemplated that other arrangements for converting the differential DC input signal to differential pulse width control signals might be incorporated. Thus, although the invention has been described with respect to a particular embodiment thereof it is not to be so limited that changes might be made therein which fall within the scope of the invention as defined in the appended claims.

I claim:

1. A servo amplifier for driving an armature drive motor from a two-terminal differential direct current input signal source comprising means for converting said differential input signal to first and second periodic drive pulses having like polarity and magnitude, said drive pulses being identical in response to zero input signal and having respective duty cycles differentially varying as a function of the magnitude and polarity of input signals other than zero; a motor drive bridge circuit comprising first, second, third and fourth transistors the emitter-collector junctions of which comprise the arms of said bridge network, a direct current power source connected across a first diagonal of said bridge, said motor connected across the second diagonal of said bridge, said drive pulses being respectively connected to first and second ones of said transistors to effect saturation thereof as a function of the pulse duty cycle, each of said first and second transistors when saturated providing a low impedance path from the connected one of said motor terminal to a first terminal of said direct current power source, means interconnecting said first transistor with said third transistor whereby said third transistor is nonconductive when said first transistor is saturated and saturated when said first transistor is nonconductive, means interconnecting said second transistor with said fourth transistor such that said fourth transistor is conductive when said third transistor is saturated and saturated when said second transistor is nonconductive, each of said third and fourth transistors when saturated providing a low impedance path from the connected one of said motor terminals to the second terminal of said direct current power source, said motor being connected to said direct current power source terminals with a first relative polarity when said first transistor is conductive and said second transistor is nonconductive and being connected to said direct current source with opposite polarity when said first transistor is nonconductive and said second transistor is conductive, said direct current power source connection with said motor terminal being broken when said first and second transistors are simultaneously conductive and simultaneously nonconductive.

2. A servo amplifier as defined in claim 1 wherein the collector-electrodes of said third and fourth transistors are connected to the positive terminal of said direct current power source, the emitter-electrodes of said third and fourth transistors being connected respectively to the collector electrodes of said first and second transistors, the emitter-electrodes of said first and second transistors being connected to the ground return terminal of said direct current power source, the emitter-collector current path of each of said transistors being shunted by a unilateral conduction device with polarization opposite that of the associated emitter-collector path.

3. A servo amplifier as defined in claim 2 wherein the means for converting said differential input signal to said first and second differential pulse width control signals comprises first and second amplifier channels each comprised of a like number of cascaded amplifier stages including a first transistor amplifier stage to which the first and second terminals of said input signal source are respectively connected as base electrode bias, means for generating a repetitive unipolarity direct current ramp signal, said ramp signal being applied through like load resistances to the collector elements of said first amplifier stages whereby the output ones of the amplifier stages in each of said amplifier channels is driven into saturation at a time within each cycle of said ramp voltage as defined by the magnitude and polarity of the input signal applied to the input of the associated amplifier channel, the output ones of said amplifier stages comprising said first and second transistors of said motor drive bridge circuit.

4. A servo amplifier as defined in claim 3 further including feedback means between the output of each of said amplifier channels and the input terminal thereof, said feedback means comprising filtering means to develop the direct current average of the output pulse waveform for application to the input terminal of the amplifier chain, said direct current average signal being a measure of the time that the output stage of said amplifier channel is driven into saturation to thus stabilize the gain of said amplifier channel.

5. Means for driving a permanent magnet motor in response to first and second differential pulse width control signals of like polarity and magnitude wherein said first and second differential pulse width signals occur at a predetermined repetition rate comprising a motor drive bridge circuit; said motor drive bridge circuit comprising a first pair of transistors the emitter-collector paths of which are serially interconnected between first and second terminals of a direct current power source, a second pair of transistors the emitter-collector path of which are likewise serially connected between the first and second terminals of said direct current power source means interconnecting the output of a first transistor in each of said pairs with the input circuit of the second transistor in the associated pair whereby said second transistor of said pair is driven to conductivity states complementary that of the first transistor, the terminals of said permanent magnet motor being respectively connected between the respective interconnection junctions of said first and second transistor pairs, each of said motor terminals being additionally connected through a unilateral conduction device to each of said direct current power source terminals, said unilateral conduction devices being respectively polarized so as to pass current in a direction opposite that established by the polarity of said power source terminals and said first and second differential pulse width control signals being applied respectively as inputs to the first transistors in each of said transistor pairs.

References Cited

UNITED STATES PATENTS

| | | | |
|---|---|---|---|
| 3,110,851 | 11/1963 | Plogstedt et al. | 318—294 XR |
| 3,167,378 | 1/1965 | Talle | 318—293 XR |
| 3,229,181 | 1/1966 | Evans | 318—293 |
| 3,260,912 | 7/1966 | Gregory | 318—341 |
| 3,309,592 | 3/1967 | Favre | 318—341 XR |

BENJAMIN DOBECK, *Primary Examiner.*

U.S. Cl. X.R.

318—294, 28